United States Patent [19]

Watkins

[11] Patent Number: 4,894,601

[45] Date of Patent: Jan. 16, 1990

[54] TESTING AND BATTERY EXERCISING METHOD AND CONTROL FOR AN EMERGENCY LIGHTING UNIT

[76] Inventor: Harley (Jim) E. Watkins, 14425 Garden Rd., Golden, Colo. 80401

[21] Appl. No.: 207,737

[22] Filed: Jun. 16, 1988

[51] Int. Cl.$^4$ .......................... G01J 5/18; G08B 13/18; F21V 33/00; H02J 7/00
[52] U.S. Cl. ........................................ 320/14; 250/342; 307/66; 320/48; 340/567; 362/276
[58] Field of Search ................ 250/342; 340/539, 567; 362/110, 111, 112, 113, 183, 276; 320/14, 48; 307/66

[56] References Cited

U.S. PATENT DOCUMENTS

| | | |
|---|---|---|
| 4,257,039 | 3/1981 | Webb et al. ...................... 362/276 X |
| 4,460,829 | 7/1984 | Settani et al. ......................... 250/342 |
| 4,544,910 | 10/1985 | Hoberman ......................... 307/66 X |
| 4,704,533 | 11/1987 | Rose et al. ............................ 250/342 |
| 4,742,336 | 5/1988 | Hall et al. ............................. 340/539 |

OTHER PUBLICATIONS

Infracon ® Technical Brochure, "Recessed Ceiling Unit", 2/1988.
Infracon ®, "Wide View Occupancy Sensor Model 700", 11/1987.
Infracon ® Case Studies, 8/1983.
Infracon ® Case Study, "World Trade Center", 5/1984.

*Primary Examiner*—R. J. Hickey
*Attorney, Agent, or Firm*—Martin, Timothy J.; J. Preston Oxenham

[57] ABSTRACT

A testing and battery exercising method and control for an emergency lighting unit, which is activated by a drop in voltage of a primary power source, provides for frequency testing of the unit by utilizing a control unit in conjunction with an infrared sensor and photocell to control a voltage reduction simulation device. The control device includes a means for sensing a change in a heat pattern over a pre-determined illumination area, a means for sensing ambient light in the illumination area, a means for simulating a reduction in voltage of a primary power line and control a unit which causes a reduction in voltage to be simulated to turn on the emergency lighting unit only when a change in the heat pattern and the illumination area is detected while the ambient light over the illumination area is below a threshold value.

19 Claims, 3 Drawing Sheets

TESTING AND BATTERY EXERCISING METHOD AND CONTROL FOR AN EMERGENCY LIGHTING UNIT

BACKGROUND OF THE INVENTION

The present invention relates generally to the control of emergency lighting units for providing secondary lighting in selected areas when primary lighting systems fail due either to a voltage drop in the power supply for the primary lighting system or when the primary lighting system is otherwise disabled. Specifically, this invention relates to the control of emergency lighting units which include a rechargeable battery, a battery charger powered by the primary power system and a switching element for turning on the emergency lighting element when the voltage of the primary power system falls below some predetermined threshld value. More particularly, the invention relates to the control and use of such emergency lighting units to test the unit and exercise its battery.

Emergency lighting systems for providing critical lighting needs during a failure of a primary lighting systems due to power loss are commonly found in many commercial and public buildings. These systems are used not only to alleviate panic and anxiety of occupants during power outage in buildings wtih very few or no windows but also to illuminate poorly lighted interior corridors and stairwells of buildings that are otherwise open to light that may be critical paths of exit during emergencies involving power failures and in areas which might provide critical routes of escape at night. Light provided by these units may also facilitate life saving and damage mitigation activities when power outages are associated with circumstances such as fires and natural disasters. Such units are often required by zoning laws and the like.

Emergency lighting units are commonly found mounted high up on walls in theatres, retail buildings, warehouses, and corridors of public buildings. They most commonly consist of one or more lighting elements mounted on a cabinet which houses a rechargeable power source, for example, a rechargeable battery, a charging unit to recharge the power source and a switching device for switching on the emergency lighting system when the voltage of the power source for the primary lighting system falls below a predetermined voltage. These units generally draw power for recharging the batteries from the primary power source. During periods over which the emergency units are not needed, the battery charger typically maintains a constant voltage trickle charge on the rechargeable battery to insure it is maintained at full capacity to be available when needed in an emergency situation. The switching unit is also connected to the primary power source and, when the switching unit senses the voltage of the primary source fall below a preset threshold voltage, it connects the lighting elements of the emergency system to the rechargeable power source to provide light while the primary lighting system is in a brown out or power out condition. Once the primary power source returns to a voltage level above the threshold level, the switching unit disconnects the lighting elements from the rechargeable power source and the charger unit provides a high current charge to the batteries to restore them to a fully charged condition. After the batteries have returned to float voltage, the charger again provides a constant voltage trickle charge to the batteries to maintain them in a fully charged condition for use should an emergency situation arise.

The manner in which a common state of the art emergency lighting unit functions may be readily understood with reference to the schematic illustration of FIG. 1, which shows an emergency lighting unit in its usual condition when primary line voltage is above the threshold value. The emergency lighting unit 1 includes lighting element 2 and battery charger 4, each included in a circuit with a rechargeable battery 3. An emergency lighting control switch 5 maintains the circuit including lighting element 2 in an open condition , as shown, so long as the primary power source voltage is above the threshold value. In this condition the battery charger 4 will provide a constant voltage trickle charge to maintain the battery 3 at full capacity. Both the control switch 5 and the charger 4 are connected to and draw their power from the primary power source 10. Should the voltage of the primary source 10 fall below the predetermined threshold voltage, emergency lighting control switch 5 will close the circuit including illuminating element 2 and battery 3 and lighting element 2 will provide emergency light drawing upon the rechargeable power source 3 until the primary power source voltage increases above the threshold value and control switch 5 reopens the illuminating element circuit of the emergency lighting unit. At that time the charger 4 will automatically provide a high current charge until the rechargeable battery 3 is fully charged at which time the charger 4 will again provide a constant voltage trickle charge to maintain the battery 3 at full capacity.

Emergency lighting systems should be subject to regular periodic inspections to insure they will be available should an emergency arise. Manufactures of these units suggest they be subject to periodic inspection, for example, every 30 days, in order to insure their proper function during emergencies. However, as in the case of many systems which are critical to the saving of lives during emergencies, when these emergency lighting units are not needed they are inconspicuous and attract little notice. Thus, inspections may be inadvertently omitted. Proper inspection of the lighting units should include checking the function of the lighting elements, rechargeable power source, charger and switching system. However, as the units are generally located in elevated positions to service to provide effective area lighting over a large illumination area and to present minimum obstruction to normal activities within the protected building, proper performance of inspections on a periodic basis frequently requires the use of ladders or lift-devices and is often difficult and time consuming and maybe performed in a cursory manner or skipped completely by maintenance personnel. Further, when inspections are time consuming and expensive, there is a natural tendency for management to divert resources to more visible and profitable activities.

Manufacturers of emergency lighting units are aware of these problems and in some cases have provided units which automatically check themselves on a periodic basis, for example, every 30 days. The unit may include a device which simulates a power outage for a brief period of time during which battery voltage and lamp operation are internally checked and a visual or audio alarm triggered if the unit is in need of servicing. Frequently, however, these alarms are provided with an override button by which the alarm may be reset so that it will not be activated again until the next automatic periodic test is initiated, thus providing a "quick fix" for maintenance personnel.

Rechargeable battery power sources such as utilized in many of these emergency units loose their ability to store electrical power over time. Generally, their power-storage ability will deteriorate more quickly if they are constantly kept in a fully charged state rather than allowed to fully or partially discharge from time to time. In most emergency lighting installations, periodic manual testing by service personnel, or automatic self-testing of the unit, do not exercise the rechargeable batteries sufficiently to significantly extend their service life. Further, the test operation of the emergency units during working hours, while the primary lighting system is on, or on a timed basis at other times when a lighting system is not needed, is a waste of electrical energy.

SUMMARY OF THE INVENTION

It is an object of the present invention to provide a new and useful method for the regular functional testing of emergency lighting unit on a frequent, periodic basis.

It is a further object of the present invention to provide that such testing will bring any malfunction of the emergency lighting system to the attention of inspection personnel on a sufficiently obvious and frequent basis during the course of their regular day to day activities to assure observation and repair of any malfunction. The present invention also has as an objective to utilize the emergency lighting unit as primary lighting during periods of test operation for limited operational activities to constructively utilize the electrical energy stored by the unit and reduce overall time the primary lighting system is in use to achieve an overall lighting energy consumption reduction.

While meeting the other objectives of the present invention, it is also an objective to utilize power from the rechargeable power source in sufficient qualities to exercise the rechargeable system adequately to extend battery life and thereby reduce costs associated with periodic replacement of the rechargeable batteries. Further, in accordance with the above objectives, it is an object to increase the value and usefulness of emergency lighting units by utilizing those units as a source of primary lighting for limited routine operations and security functions during hours of darkness.

The emergency lighting unit testing and battery exercise control device of the present invention provides for frequent testing of an emergency lighting unit by utilizing a control unit in conjunction with an infrared sensor and photocell to control a voltage reduction simulation device. Activation of the emergency lighting unit is controlled in a manner which provides a test function and increases the life of the rechargeable power source while allowing the emergency lighting unit to supplement primary lighting systems. In the test and battery exercise control device of the present invention, the infrared sensor senses the heat pattern over the area to be lighted by the emergency lighting unit and generates a change indicative signal to the control device when there is a change in the heat pattern. The photocell senses the level of ambient light in the illumination area and generates a darkness indicative signal to the control device when the iluminated area has reduced ambient light. The control device receives the signals from the infrared sensor and the photocell sensor, and, only when both a change indicative signal and a darkness indicative signal are received simultaneously, the control device generates a signal to the voltage reduction simulation device. In response to the signal from the control device, the voltage reduction simulation device changes the primary power source voltage to the emergency light unit control switch causing the emergency lighting system to be activated. The control device may include a timer which causes the signal to the simulated voltage reduction device to be maintained for at least a predetermined amount of time once initiated. Maintaining the emergency lighting device in a lighted state causes a corresponding amount of electrical power to be drawn from the rechargeable power source.

With this arrangement, an inspector may test the emergency lighting unit by merely walking into the illumination area of the emergency lighting unit when the primary lighting source is turned off. This causes the infrared sensor to sense a change in the heat pattern over the illumination area and generate a change indicative signal to the control device while the photocell is sending a darkness signal to the control device. This causes the emergency lighting unit to be activated for a predetermined amount of time and any malfunctions can be observed.

When the testing and battery exercising control device of the present invention is installed with emergency lighting units in areas which are subject to operational or security inspections which require only the local area being inspected to be illuminated, during periods when there is no other need for primary lighting, the emergency lighting units may be utilized to provide the local light required. This elimintes the need to activate a primary lighting system, which would illuminate a larger area and draw more power, and thus reduces overall lighting energy consumption. Further, when emergency lighting units are utilized in this manner, any malfunction of the units may be observed by operations and security personnel during their routine security or operational inspections. The programmed response of the control device to the signals from the infrared sensor and photocell provide that the emergency lighting system will be turned on only during periods of darkness and when inspection personnel are present. When the primary lighting system is on, or if other ambient light is present, the emergency system will not be activated though there is a change in the heat pattern over the illumination field sensed by the infrared sensor.

By setting the timer of the control device appropriately, the amount of power drained from the rechargeable power source during each inspection period may be set to extend the life of the rechargeable power source. Further, the arrangement of the testing and exercising device of the present invention provides a security function as any unauthorized party who should gain entry to the illumination area of the emergency lighting unit will be startled when local emergency lighting is turned on.

Accordingly, the method of controlling an emergency lighting unit to facilitate testing of the unit and exercising of its batteries includes sensing a heat pattern over the preselected illumination area and determining when a change in the heat pattern occurs; sensing ambient light in the preselected area and determining when the ambient light in the preselected area is less than or equal to preselected threshold; and simulating a reduction in voltage of the power line in such a manner as to activate the switching means in response to a change in the heat pattern only when the ambient light is less than or equal to the preselected threshold whereby an inspector may observe the function of the unit by entering the illumination area when it is in darkness.

These and other objects of the present invention will become more readily appreciated and understood from a consideration of the following detailed description of the preferred embodiment when taken together with the accompanying drawings, in which:

DETAILED DESCRIPTION OF THE INVENTION

Figure 1:
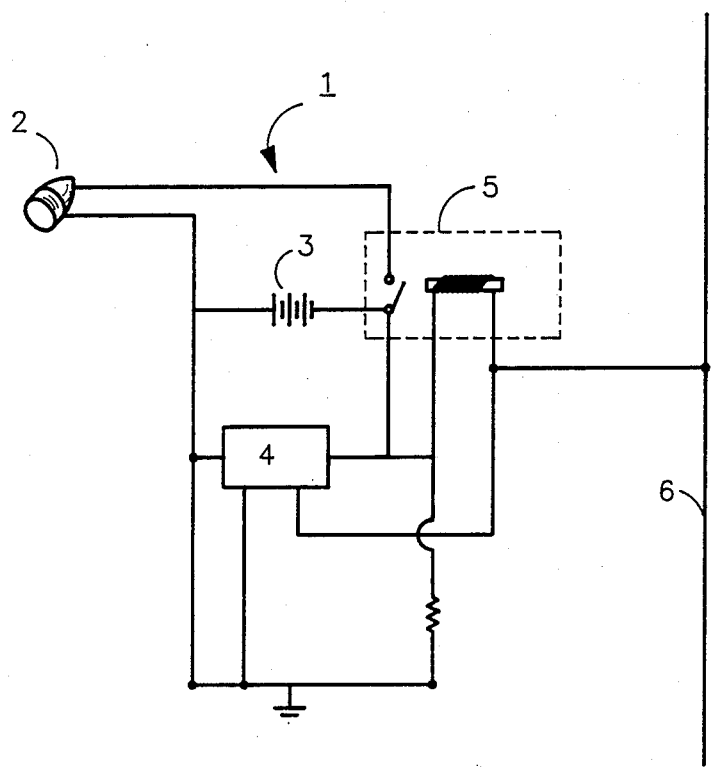
FIG. 1 is aschematic illustration of a typical emergency lighting unit according to the prior art.
Figure 2:
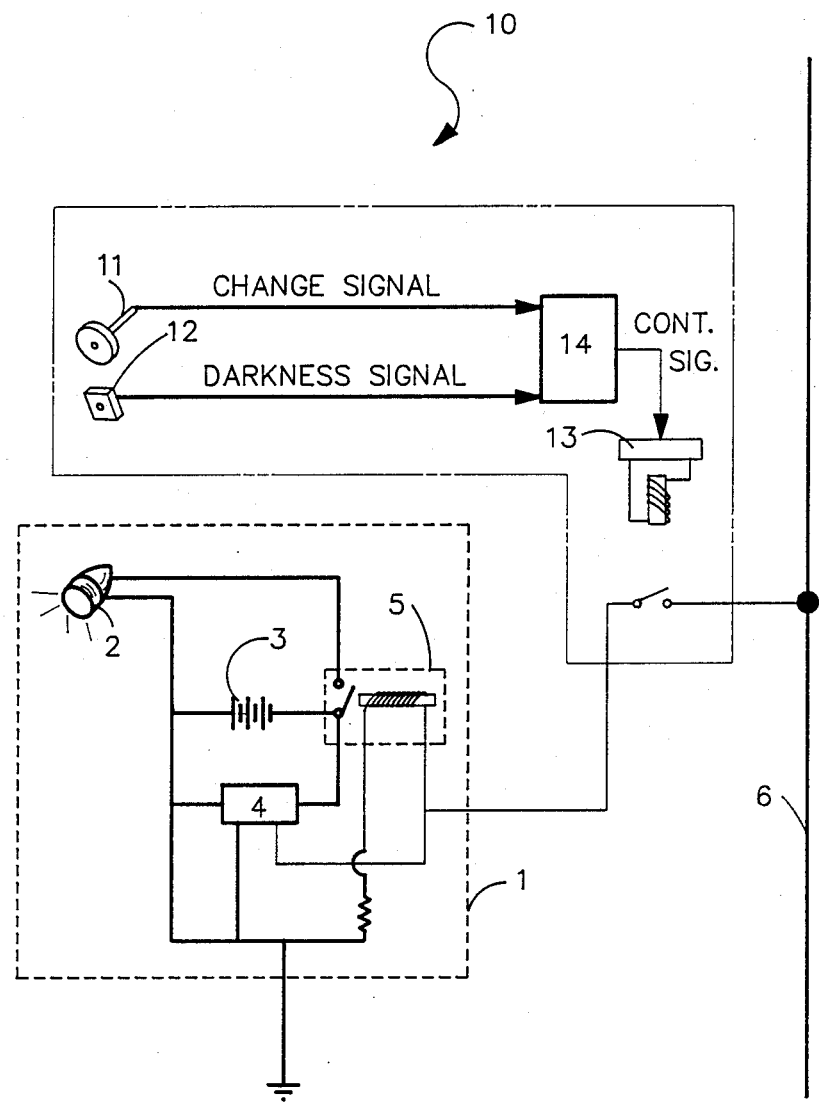
FIG. 2 is a schematic illustration of an emergency lighting unit combined with a testing and battery exercising control device in accord with the present invention which accomplishes the method of the present invnetion.

An embodiment comprising the present invention is shown in FIG. 2 wherein the present invention is combined with the typical emergency lighting unit illustrated in FIG. 1. Like reference numerals in FIGS. 1 and 2 indicate either identical or equivlent elements of the typical emergency lighting unit. In the embodiment of FIG. 2 infrared sensor 11 is positioned to sense a heat pattern over the area of illumination of the lighting element 2 of the emergency lighting unit. When any change in the heat pattern of the illumination area is detected by infrared sensor 11, it generates a change indicative signal. Similarly, photocell 12 is positioned to sense whether the area of illumination of the lighting element 2 is in normal or reduced ambient light. For purposes of this description, a condition of reduced ambient light is sometimes referred to as "darkness" light.

When the area of illumination is in darkness, photocell 12 generates a darkness indicative signal. The construction of both the infrared sensor 11 and photocell 12 of the embodiment of FIG. 2 are well konwn to those familiar with the art and such devices are commonly utilized to control lighting systems, doors, and in other control applications. The voltage reduction simulation device, here a solenoid powered switch 13, is responsive to a control signal generated by control unit 14 to disconnect the emergency lighting system 1 from the primary power line 6 to simulate a power outage and cause the emergency light control switch 5 of the emergency lighting system 1 to complete the circuit including light 2 and battery 3 to illuminate the illumination area of the emergency lighting unit. Control unit 14 continuously monitors the infrared sensor 11 and the photocell 12 to received any change indicative signal generated by the infrared sensor 11 and darkness indicative signal generated by photocell 12. Only when control unit 14 receives a change indicative signal and a darkness indicative signal simultaneously does the control unit 14 generate a control signal to cause the solenoid switch to disconnect the emergency lighting unit 1 from the primary power line 6.

Control unit 14 includes an adjustable timing element and, once the control unit has initiated the control signal, the signal is maintained continuously for a minimum pre-determined period of time. The minimum period of time is selected such that the lighting element 2 will draw an amount of electrical power from rechargeable battery 3 during each test and battery exercise cycle which will result in maximum life of the rechargeable battery 3 under the operational conditions expected to be experienced by the particular emergency lighting installation. Thus, the minimum time period selected will be dependent upon the expected frequenty of cycling of the emergency lighting unit by the test and exercise device, but with due consideration of the time necessary to perform inspections or other activities for the which the emergency lighting unit will be used as a primary light source.

Figure 3:
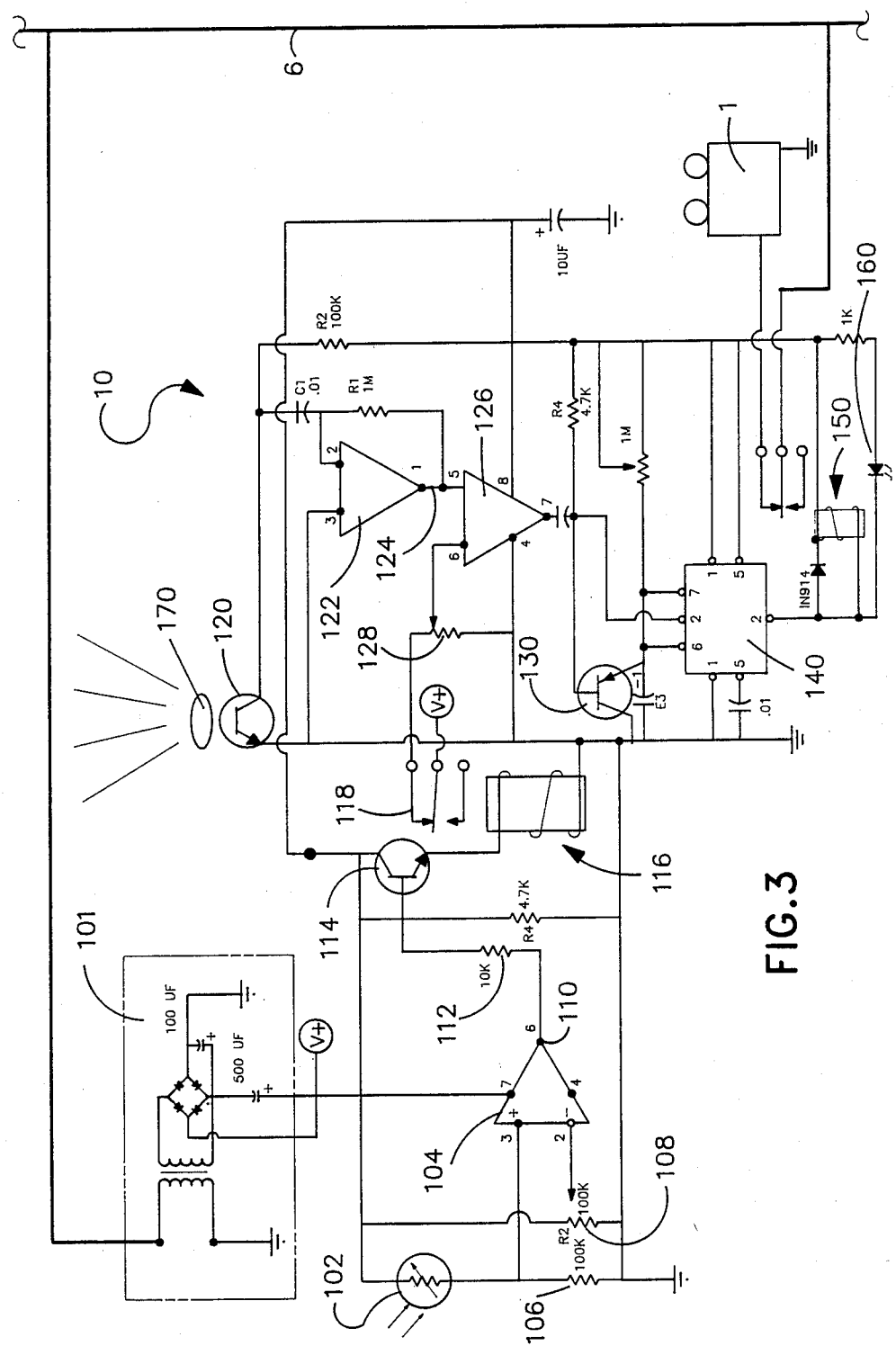
FIG. 3 is a more detailed schematic illustration of the testing and battery exercising control device of the present invention utilized in conjunction with a typcial emergency lighting unit.

FIG. 3 is a more detailed schematic illustration of an emergency lighting unit testing and battery exercise control device 10, according to the present invention, interposed between emergency lighting system 1 and primary power line 6. Power unit 101 provides a positive voltage, V+, for photocell 102 with photocell 102 being connected to a first voltage comparator 104 and to ground through a resistor 106. A second side of comparator 104 is connected to V+through a variable resistor 108 and then to ground. Variable resistor 108 provides a sensitivity setting for ambient light, so that, when photocell 102 senses more a minimum threshold ambient light, comparator 104 generates a voltage signal at 110 which signal is provided through a resistor 112 to transistor switch 114. Transistor switch 114, upon becoming conductive, activates a relay 116. Relay 116 is shown in the normal, open position which causes a positive voltage to be provided to contact 118. However, when transistor switch 114 is conductive, relay 116 opens contact 118 to disconnect contact 118 from V+. Accordingly, in conditions of adequate illumination over the illumination area, the control circuit consumes a small amount of power to maintain relay 116 in an active state.

However, when ambient light over the illumination area is reduced to a condition of "darkness", below the sensitivity threshold set by resistor 108, transistor switch 114 is non conductive and relay 116 is turned "off" so that contact 118 is connected to V+. This provides power to the circuit containing infrared sensor 120. Infrared sensor 120 is preferably a phototransistor in the infrared range so that, when an infrared source is available within the illumination area, phototransistor sensor 120 generates a voltage signal which is amplified by operational amplifier 122. The amplified voltage produced at 124 is then presented to voltage comparator 126 which compares that signal with a reference voltage from contact 118 through a sensitivity selecting resistor 128.

When the voltage signal from phototransistor 120, as amplified by operational amplifier 122, exceeds the reference voltage, voltage comparator 126 generates a signal which activates transistor switch 130 which, in turn, activates timer 140. Timer 140 then activates relay 150 which interrupts the line current to the emergency lighting unit 1, thus simulating a "power out condition". This power out condition is simulated until timer chip 140 times out for the preset time interval is determined by adjustable resistor 132 and power is restored to emergency lighting system 1. If the infrared source generating an infrared change in the illuminated area is still preset, and if the ambient light striking photocell 102 does not exceed the minimum threshold, timer 140 is immediately reset to activate relay 150 for a second time interval equal to the first. If, however, either the ambient light has increased, for example where a watchman, tester or security guard turns on the primary lighting source, or should the infrared source have been removed from the illumination region, for example, by the departure of the watchman, tester or security guard, then no signal is provided to timer 140 and the unit remains in a ready state.

It should be appreciated that the electrical components used to construct emergency lighting unit testing and battery exercise control device 10 are well known in the art. For example, voltage comparator 110 and 126, as well as operational amplifier 122, may simply be 741 micro-chips, and timer 140 may be an NEC 555 timing chip. An LED 160 may be provided to indicate the mode of operation of the infrared phototransistor 120. Further, it should be appreciated that an optical lens 170 may be provided to intensify the infrared light received by the phototransistor 120 thus setting the range and "field of view" of sensor 120.

From the foregoing, the method according to the preferred embodiment of the present invention should be appreciated. The method of the present invention provides for testing and exercising of an emergency lighting and control unit, such as control unit 1, by simulating a blackout situation by interrupting the primary power supply that is normally supplied to the switching unit of emergency lighting unit 1. Broadly, the method according to the preferred embodiment of the present invention includes sensing ambient light in the preselected area and determining when such ambient light is less than or equal to a preselected threshold value; sensing a heat pattern over the preselected illumination area and determining when a change in the heat pattern occurs; simulating a reduction in voltage of the power line to activate a switch means in the emergency lighting unit only when the ambient light is less than or equal to a preselected threshold so that an inspector may observe the function of the unit by entering the illumination area when the illumination area is at less than or equal to the preselected ambient light threshold. Preferably, the method responses to a change introduced by the human body in the illumination area, and the change in heat pattern is sensed with an infrared heat sensing means. Ambient light is preferably monitored by a photocell, and the emergency lighting unit preferably activated for a preselected time by a timing unit after which the control circuit is reset.

Accordingly, the present invention has been described with some degree of particularity directed to the preferred embodiment of the present invention. It should be appreciated, though, that the present invention is defined by the following claims construed in light of the prior art so that modifications or changes maybe made to the preferred embodiment of the present invention without departing form the inventive concepts contained herein.

I claim:

1. A method of testing and exercising an emergency lighting unit, the unit electrically connected to a primary power source and including illuminating means powered by a rechargeable power source, means for recharging the rechargeable power source from a primary power line and switching means responsive to a reduction of voltage in the primary power line to switch on the illuminating means to illuminate a pre-selected illumination area comprising the steps of:

sensing a heat pattern over the pre-selected illumination area and determining when a change in said heat pattern occurs;
sensing ambient light in the pre-selected area and determining when the ambient light in the preselected area is less that or equal to a preselected threshold; and
simulating a reduction in voltage of the power line in such a manner as to activate the switching means in response to a change in the heat pattern only when the ambient light is less than or equal to the preselected threshold whereby an inspector may observe the function of the unit by entering the illumination area when it is in darkness.

2. The testing and exercising method of claim 1, wherein said change is determined to be a change corresponding to the introduction of a human body into the illumination area 3. The testing and exercising method of claim 1 in which the change in the heat pattern is sensed with an infrared heat sensing means.

4. The testing and exercising method of claim 1 in which ambient light is sensed with a photocell light sensing means.

5. The testing and exercising method of claim 1 further comprising the steps of:

timing the voltage reduction simulation;
maintaining said simulation for a predetermined time; and
ending the voltage reduction simulation at the end of the pre-determined time.

6. The testing and exercising method of claim 1 in which said voltage reduction simulation comprises disconnecting the switching means from the primary power line.

7. A control device for testing and exercising an emergency lighting unit, the unit electrically connected to a primary power line and including iluminating means powered by a rechargeable power source, means for recharging the rechargeable power soruce, and switching means responsive to a reduction in voltage of the primary power line to switch on the illuminating means to illuminate a pre-determined illumination area, comprising:

means for sensing a heat pattern over the predetermined illumination area and producing a change indicative signal when a change in the heat pattern occurs;
means for sensing ambient light in the preselected illumination area and producing a darkness indicative signal when the ambient light in is less than or equal to a preselected threshold;
means for simulating a reduction in voltage of the primary power line in response to a control signal; and,
means for receiving said change indicative signal and said darkness indicative signal and producing said control signal only when both said change indicative signal and said dark indicative signal are received simultaneously to control said simulation means.

8. A testing and exercising device as in claim 7, wherein said change is determined to be a change corresponding to the introduction of a human body into the illumination area.

9. A testing and exercising device as in claim 7 in which said heat sensing means is an infrared device.

10. A testing and exercising device as in claim 7 in which said ambient light sensing means is a photocell device.

11. A testing device as in claim 7 in which said simulating means is a switch which electrically disconnects the emergency lighting unit from the primary power line.

12. A device as in claim 7 in which said control means further includes a timer and continues to produce said control signal for a pre-determined minimum period of time once the signal is initiated.

13. In an emergency lighting unit electrically connected to a primary power line, the unit including illuminating means powered by a rechargeable power source, means for recharging the rechargeable power source from the primary power line and switching means responsive to a reduction in voltage of the primary power line to switch on the illuminating means to illuminate a pre-determined illumination area, the improvement comprising:
  means for sensing a heat pattern over a preselected illumination area and providing a change indicative signal when a change in the heat pattern occurs;
  means for sensing ambient light in the preselected area and producing a darkness indicative signal when the ambient light is less than or equal to a preselected threshold;
  means for simulating a reduction in voltage of the primary power line in response to a control signal; and
  means for receiving said change indicative signal and said darkness indicative signal and producing said control signal only when both said change indicative signal and said darkness indicative signal are received simultaneously to control said simulation means.

14. A testing and exercising device as in claim 13 wherein said change is determined to be a change corresponding to the introduction of a human body into the illumination area.

15. A testing and exercising device as in claim 13 in which said heat sensing means is an infrared device.

16. A testing and exercising device as in claim 13 in which said ambient light sensing means is a photocell device.

17. A testing and exercising device as in claim 131 in which said simulating means is a switch which electrically disconnects the emergency lighting unit from the primary power line.

18. A testing and exercising device as in claim 13 in which said control means further includes a timer and continues to produce said control signal for a predetermined minimum period of time once the signal is initiated.

19. A testing and exercising device as in claim 13 in which said heat sensing means is an infrared device, said ambient light sensing means is a photocell device, and said receiving means includes means for disabling said infrared device when a darkness indicative signal is received by said receiving means.

* * * * *